US008166063B2

(12) United States Patent
Andersen et al.

(10) Patent No.: US 8,166,063 B2
(45) Date of Patent: Apr. 24, 2012

(54) QUERY ROUTING IN DISTRIBUTED DATABASE SYSTEM

(75) Inventors: Frank-Uwe Andersen, Berlin (DE); Tobias Hoβfeld, Würzburg (DE); Gerald Neitzert, Wiesloch (DE); Simon Oechsner, Gerbrunn (DE); Wolfgang Scheidl, Bernhardswald (DE); Hans-Ulrich Schoen, Ebenhausen (DE); Phuoc Tran-Gia, Würzburg (DE); Kurt Tutschku, Gerbrunn (DE)

(73) Assignee: Nokia Siemens Networks Oy, Espoo (FI)

( * ) Notice: Subject to any disclaimer, the term of this patent is extended or adjusted under 35 U.S.C. 154(b) by 667 days.

(21) Appl. No.: 12/337,241

(22) Filed: Dec. 17, 2008

(65) Prior Publication Data

US 2009/0157641 A1    Jun. 18, 2009

(30) Foreign Application Priority Data

Dec. 17, 2007  (EP) .................................. 07150067

(51) Int. Cl.
*G06F 17/30* (2006.01)

(52) U.S. Cl. ........ 707/770; 707/706; 707/713; 707/754; 707/758; 709/200; 709/201; 709/204; 709/213; 709/230; 709/245; 711/4

(58) Field of Classification Search ........................ None
See application file for complete search history.

(56) References Cited

U.S. PATENT DOCUMENTS

| | | | | |
|---|---|---|---|---|
| 5,371,852 A | * | 12/1994 | Attanasio et al. | 709/245 |
| 6,070,191 A | * | 5/2000 | Narendran et al. | 709/226 |
| 6,272,523 B1 | * | 8/2001 | Factor | 709/201 |
| 6,351,775 B1 | | 2/2002 | Yu | |
| 6,393,415 B1 | * | 5/2002 | Getchius et al. | 1/1 |
| 6,523,036 B1 | * | 2/2003 | Hickman et al. | 707/704 |
| 6,578,066 B1 | * | 6/2003 | Logan et al. | 718/105 |
| 6,667,980 B1 | * | 12/2003 | Modi et al. | 370/395.32 |
| 6,728,748 B1 | * | 4/2004 | Mangipudi et al. | 718/105 |
| 6,748,413 B1 | * | 6/2004 | Bournas | 718/105 |
| 7,043,563 B2 | * | 5/2006 | Vange et al. | 709/245 |

(Continued)

FOREIGN PATENT DOCUMENTS

EP    1 589 442 A2    10/2005

OTHER PUBLICATIONS

Leong et al, "Achieving one-hop dht lookup and strong stabilization by passing tokens", MIT computer science and artificial intelligence laboratory, 2004.*

Nonnerat et al, "D1HT: A distributed one hop hash table", IEEE, 2006.*

Stoica et al, "Chord: A Scalable Peer-to-peer Lookup Service for Internet Applications", University of California, Berkley, 2001.*

(Continued)

*Primary Examiner* — Hung Le
(74) *Attorney, Agent, or Firm* — Squire Sanders (US) LLP (57) ABSTRACT

A query message is received at a first server of a plurality of servers of a first server type, at least part of data contained in the query message is transformed to a transforming result, based on the transforming result and a first lookup table at said first server, a storage location of a respective second lookup table at one of said plurality of servers of said first type is determined, the respective second lookup table is accessed at the determined storage location of the respective second lookup table at one of said plurality of servers of said first type, and an indicator indicating a storage location of data requested by the query message is retrieved from the respective second lookup table.

35 Claims, 9 Drawing Sheets

U.S. PATENT DOCUMENTS

| | | | | |
|---|---|---|---|---|
| 7,340,532 B2* | 3/2008 | Swildens | ............... | 709/238 |
| 7,581,056 B2* | 8/2009 | Chandrasekaran | ............... | 711/4 |
| 7,975,109 B2* | 7/2011 | McWilliams et al. | ........ | 711/147 |
| 8,051,034 B2* | 11/2011 | Mehta et al. | ............... | 707/607 |
| 2004/0090966 A1* | 5/2004 | Thomas | ............... | 370/395.52 |
| 2006/0129675 A1* | 6/2006 | Zimmer et al. | ............... | 709/225 |
| 2006/0230098 A1* | 10/2006 | Shen et al. | ............... | 709/201 |
| 2007/0120576 A1* | 5/2007 | Ford et al. | ............... | 326/41 |
| 2007/0143344 A1* | 6/2007 | Luniewski et al. | ........ | 707/104.1 |
| 2008/0154579 A1* | 6/2008 | Kummamuru | ............... | 704/9 |
| 2008/0194226 A1* | 8/2008 | Rivas et al. | ............... | 455/404.2 |

OTHER PUBLICATIONS

Bai et al, "Web Delay Analysis and Reduction by Using Load Balancing of a DNS-Based Web Server Cluster", Internal Journal of Computers and Applications, vol. 29, No. 1, 2007.*

Willy Tarreau, "Making Applications Scalable With Load Balancing", 2006.*

European Search Report for Application No. EP 07 15 0067 dated Sep. 8, 2010.

Stoica, I. et al., *Chord: A Scalable Peer-to-Peer Lookup Service for Internet Applications*, SIGCO MM'01, San Diego, CA, (2001), pp. 1-12.

* cited by examiner

Each object is stored at the first peer succeeding the object's hash value

QUERY ROUTING IN DISTRIBUTED DATABASE SYSTEM

CROSS-REFERENCE TO RELATED PATENT APPLICATIONS

European Patent Office priority application EP 07150067.2 filed Dec. 17, 2007, including the specification, drawings, claims and abstract is incorporated herein by reference in its entirety.

FIELD OF THE INVENTION

The present invention relates to methods and servers applicable in distributed database or application server systems, in particular in a front-end layer of such systems.

BACKGROUND OF THE INVENTION

In a distributed database system data is located not only on one but on several different database servers. A lookup system is required in order to be able to route queries for a specific data item to a database server called back-end database server that stores this item. Pointers to these back-end database servers are stored in the lookup system which is also called front-end system. These pointers are generally of the format <key, value>, where the key is a valid search key for a back-end database server, and the value is an address of the back-end database server where the corresponding data item is located. Thus, when a query, e.g., an LDAP (Lightweight Directory Access Protocol) command, is issued to a distributed database system, it is first resolved in the front-end system (which is constituted by front-end servers, hereinafter also referred to as servers of a first server type), and then forwarded to the correct address in the back-end system (which is constituted by back-end servers, hereinafter also referred to as servers of a second server type), where it can be processed.

Recently, there is a trend in mobile network database system design to create only one logical database that physically runs on a multitude of servers and also unifies different types of databases, for example, HLR (Home Location Register), RADIUS (Remote Authentication Dial-In User Service), OAM DB (Operation And Maintenance DataBase), NM DB (Network Management DataBase), etc.

In conventional distributed database front-end systems the pointers as described above are saved in all nodes constituting the front-end system.

SUMMARY OF THE INVENTION

The invention aims at providing memory efficient routing of database queries in a distributed database system.

This is achieved by methods, servers and a system as defined in the appended claims. The invention may also be implemented as a computer program product.

According to the invention, instead of storing a complete lookup table (i.e. a collection of pointers, indicating where data items are located in back-end server devices) in every front-end server device, each front-end server device only needs to keep a portion of the lookup table (referred to as a respective second lookup table) and a "partitioning table" (referred to as a first lookup table) which indicates which front-end server device is responsible for which section of data stored in the back-end server devices, i.e. which part of lookup table is located in which front-end server device.

According to an embodiment of the invention, a query message is received by a front-end server device which is called a first device. A part of data in the query message is hashed in the first server device. By comparing the hashing result and the partitioning table (first lookup table), the first server device detects where a pointer of requested data is located.

If the pointer of the requested data is located in the first server device, it sends a request to a back-end server device indicated by the pointer to fetch the data.

If the pointer of the requested data is not located in the first server device, according to the partitioning table, the first device knows the right front-end server device (second server device) which contains the pointer of the requested data. The first server device in such case forwards the query message to the second server device.

The second server device resolves the query message substantially in the same way as the first device (but without consulting the first lookup table at the second server) and returns the pointer of the requested data to the first device.

The first server device then sends a request to a back-end server indicated by the pointer and fetches the data.

The first server device replies the query message with the requested data.

According to the present invention, in the worst case, only one forwarding is needed to locate the requested data. Each front-end server device only needs to store the partitioning table and a portion of the lookup table instead of the whole lookup table, which saves a lot of memory.

The present invention is especially useful in large deployment scenarios, in which there are a huge number of front-end server devices.

The present invention is applicable to a front-end layer of large-scale data base applications or services. Application queries destined to a back-end layer which contains requested data sets or service logic are sent through the front-end layer in order to distribute load, pre-process data, or route queries according to the physical layout of the back-end system.

In a time-critical application, e.g., accessing mobile user data as a provider, the amount of time spent in the server devices of the front-end layer should be as short as possible. Therefore, the lookup data (contained in the first and/or respective second lookup table) is held in the random access memory (RAM) of a respective front-end server device, from where it can be accessed faster as compared to a scenario in which it is stored on a hard disk.

This makes the hardware limitations, i.e., how much memory a server can be equipped with, a problem. With the amount of data stored in the back-end, the number of lookup entries in the front-end also increases. The same is true for a higher number of search keys. Therefore, the amount of lookup data may become too large to be stored on a single server.

A front-end server according to the present invention only needs to store a small table, i.e. a first lookup table indicating which front-end server is responsible for which section of data stored in back-end servers, and a portion of the lookup data in a respective second lookup table. Thus, the invention can cope with time-critical applications in large deployment scenarios.

BRIEF DESCRIPTION OF THE DRAWINGS

FIG. 2 consisting of FIGS. 2A and 2B shows a flow chart illustrating a database query method according to an embodiment of the invention.

DESCRIPTION OF THE EMBODIMENTS OF THE INVENTION

Figure 1:
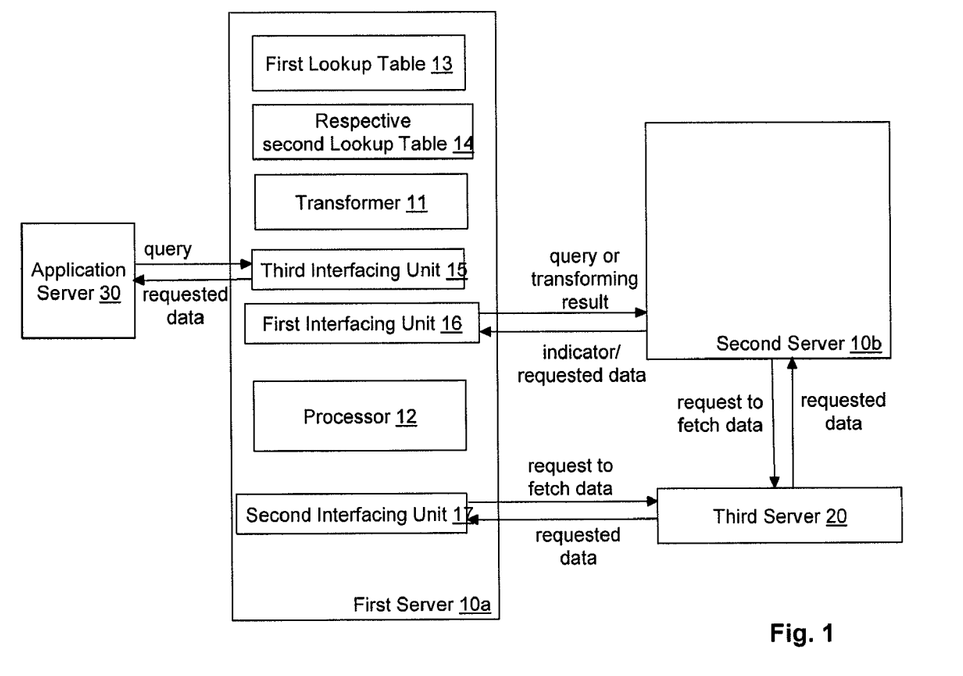
FIG. 1 shows a schematic block diagram illustrating an arrangement of a system according to an embodiment of the invention.

FIG. 1 shows a schematic block diagram illustrating an exemplary arrangement of a system according to an embodiment of the invention.

The system comprises a plurality of servers of a first server type including a first server and a second server, (i.e. 10a and 10b). The system is not limited to the number of two servers of the first server type as shown in FIG. 1 but may comprise more than two servers of the first server type. The servers of the first server type constitute the front-end system. The system may further comprise a plurality of servers of a second server type including a third server 20. The system is not limited to the number of one server of the second server type as shown in FIG. 1 but may comprise more than one server of the second server type. The servers of the second server type constitute the back-end system. FIG. 1 also shows an application server 30 which may send a query message towards the system. That query message is received by one server of the plurality of servers of the first server type, in the illustrated example it is received by the first server 10a.

The first server 10a comprises a transformer 11 and a processor 12. The first server 10a has access to a first lookup table 13 and a respective second lookup table 14. The lookup tables 13, 14 may be stored in a storage unit (not shown) of the server 10a, such as a hard disk, RAM or any other storage unit.

The first server 10a may further comprise an interfacing unit (a first interfacing unit) 16 providing an interface between the first server 10a and the other servers of the first server type including the second server 10b. The first server 10a may have a further interfacing unit (a second interfacing unit) 17 providing an interface between the first server 10a and the plurality of servers of the second server type including the third server 20, and an interfacing unit (a third interfacing unit) 15 providing an interface between the first server 10a and servers, such as the application server 30, initiating a query.

The second server 10b may have a similar configuration as the server 10a. Namely, in case the query is sent from the application server 30 to the second server 10b, the second server 10b operates as the first server 10a since it is the "first" server in the front-end server system that receives the query.

The transformer 11 transforms at least part of data contained in a query message, received via the third interfacing unit 15 from the application server 30, to a transforming result.

The processor 12 determines, based on the transforming result and the first lookup table 13, a storage location of a respective second lookup table at one of the plurality of servers of the first server type, accesses the respective second lookup table 14 at the first server 10a if the processor 12 determined that the storage location of the respective second lookup table is at the first server 10a, and retrieves an indicator indicating a storage location of data requested by the query message from the respective second lookup table 14.

Based on the retrieved indicator, the second interfacing unit 17 may fetch the data requested by the query message from a server of the plurality of servers of the second server type, e.g. the third server 20.

The first interfacing unit 16 may forward the transforming result or the query message to another server of the plurality of servers of the first server type, e.g. the second server 10b, if the processor 12 determined that the storage location of the respective second lookup table is not at the first server 10a but at another server of the first server type constituting the front-end system, e.g. at the second server 10b.

Looking at the second server 10b, in case the query message was forwarded from the first server 10a to the second server 10b, through the first interfacing unit 16, a transformer of the second server 10b transforms at least part of data contained in the query message to a transforming result.

A processor of the second server 10b determines (i.e. concludes), based on the fact that it receives the query message or the transforming result from the first server 10a, that the storage location of the respective second lookup table is at the second server 10b, accesses the respective second lookup table, and retrieves an indicator indicating a storage location of data requested by the query message from the respective second lookup table. (Note that a query message forwarded from one front-end server to another front-end server is thus distinguishable from a query message sent from an application server to a front-end server, e.g. by at least one bit in the message indicating the respective node or type of node that sent the message to the front-end server receiving the query message.) A first interfacing unit of the second server 10b may send the retrieved indicator to the first server 10a, and the first interfacing unit 16 may receive the retrieved indicator from the second server 10b.

Based on the indicator received from the second server 10b, the second interfacing unit 17 may fetch the data requested by the query message from the third server 20.

Alternatively, through its third interfacing unit, the second server 10b may fetch the data requested by the query message from the third server 20 and forward the data to the first server 10a. The first interfacing unit 16 may receive the data requested by the query message from the second server 10b. Alternatively, through its third interfacing unit, the second server 10b may forward the data to the application server 30.

Again looking at the second server 10b, this server comprises an interfacing unit (first interfacing unit, not shown) which may receive a transforming result based on at least part of data contained in a query message, a processor (not shown) may conclude, based on the receipt of the transforming result, that a storage location of a respective second lookup table is at the second server 10b, access the respective second lookup table, and retrieve an indicator indicating a storage location of data requested by the query message from the respective second lookup table.

The interfacing unit may be configured to return the retrieved indicator from the second server 10b to another server from which the transform result or the query message was received, e.g. the first server 10a.

The second lookup table may comprise at least one pair of data, including, for each transforming result, a pointer indicating a location of data stored in a server of the second server type, wherein the second lookup tables of all servers of the first server type constitute a complete lookup table.

Respective second lookup tables of each server of the first server type may equal each other in terms of size, or differ from each other in terms of size either in proportion to a respective processing capacity of each of the servers or in such a manner that a processing load for each of the servers of the first server type equals each other.

The first lookup table may comprise at least a pair of data, wherein each pair of data comprises an address of a server of a first server type and a value range defined by a starting value and an end value, in a space to which the part of data in the query message is transformed.

The servers of the first server type may be front-end servers and the address may be an IP address of the respective servers.

The transformer 11 may map a string into a natural integer.

The transformer 11 may apply a Hash transform, and the space may be a Hash space resulting from the Hash transform.

Here the functions of the first and second servers relevant for understanding the principles of the invention are described using functional units and/or blocks as shown in FIG. 1. The arrangement of the blocks of the first server is not construed to limit the invention, and the functions may be performed by one block (e.g. as regards the interface units) or further split into sub-blocks (e.g. as regards the processor).

Figure 2A:
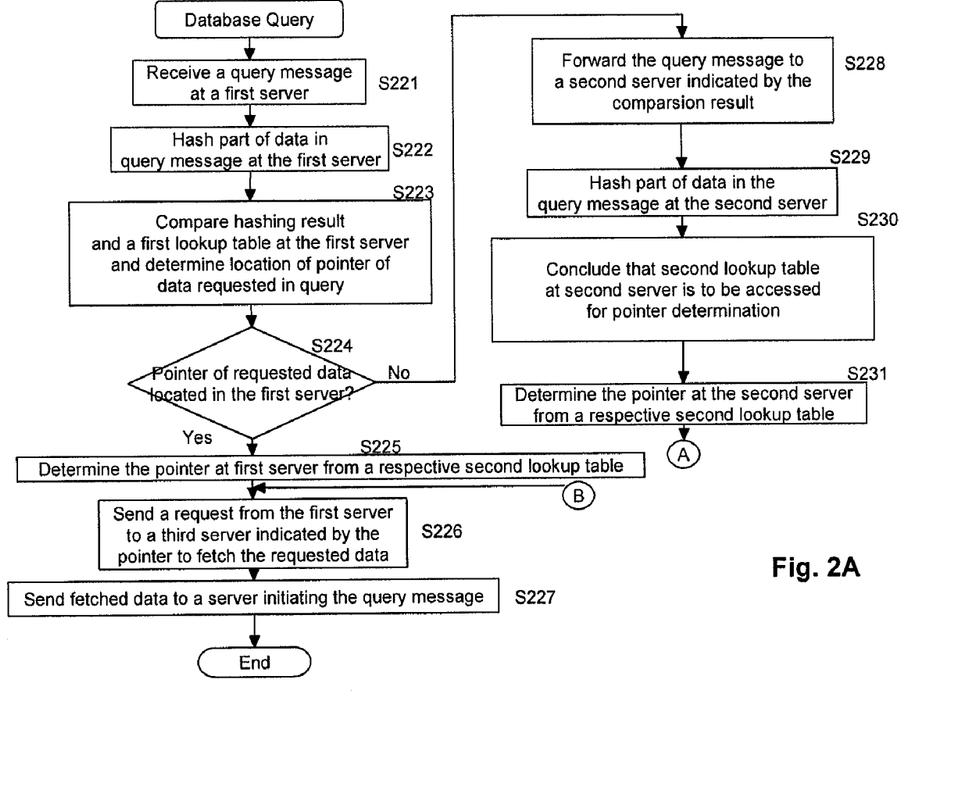
Figure 2B:
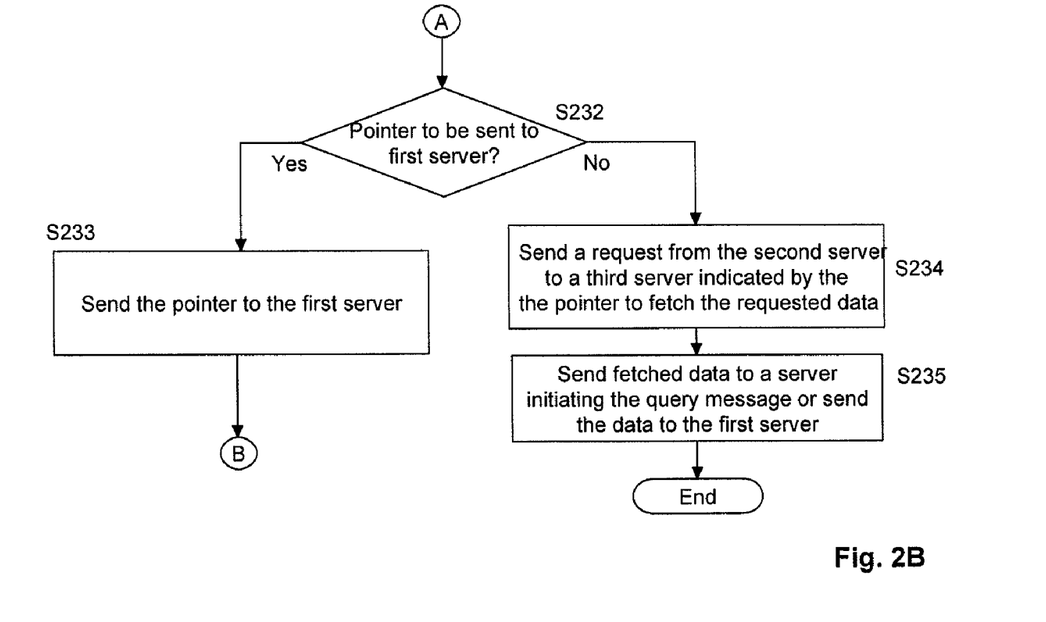

FIGS. 2A and 2B show a flow chart illustrating a database query method according to an embodiment of the invention.

In step S221, a query message is received at a first server of a plurality of servers of a first server type. In step S222, at least part of data contained in the query message is transformed to a transforming result. For example, the part of data may be hashed to a hashing result (i.e. subjected to a Hash transform).

In step S223, based on the transforming result and a first lookup table at the first server, a storage location of a respective second lookup table at one of the plurality of servers of the first type is determined. For example, the hashing result and the first lookup table may be compared at the first server and the location of a pointer of data requested in the query message may be determined.

In step S224 it is decided whether the storage location of the respective second lookup table, e.g. the location of the pointer of the requested data, is at the first server or not. If YES in step S224, i.e. the determining in step S223 yields that the storage location of the respective second lookup table is at the first server, the first server accesses its respective second lookup table, and an indicator (e.g. the pointer) indicating a storage location of data requested by the query message is retrieved from the respective second lookup table at the first server in step S225.

In step S226, a request may be sent from the first server to a third server, i.e. a server of a second server type, indicated by the pointer to thereby fetch the requested data, and the fetched data may be sent to a server initiating the query message, e.g. an application server, in step S227.

However, if NO in step S224, i.e. the determining in step S223 yields that the storage location of the respective second lookup table is at a second server of the first server type different from the first server, in step S228 the query message is forwarded from the first server to the second server.

In step S229, at the second server at least part of data contained in the query message is transformed to the transforming result. For example, the part of data may be hashed to obtain the hashing result.

In step S230, based on the receipt of the query message at the second server that originates from the first server, and based on the transforming result obtained on the basis thereof at the second server, the storage location of the respective second lookup table is concluded to be at the second server. The second server of the first server type is storing the respective second lookup table including an indicator (pointer) indicating a storage location of data requested by the query message. For example, based on the hashing result the location of the pointer can be retrieved from the second lookup table at the second server.

In step S231, the indicator (pointer) indicating the storage location of the data requested by the query message is determined at the second server from the respective second lookup table.

In step S232 it is decided at the second server whether the pointer is to be sent to the first server. If YES in step S232, the second server sends the pointer to the first server in step S233, and the first server may perform steps S226 and S227.

However, if NO in step S232, a request may be sent from the second server to a third server, i.e. a server of a second server type, indicated by the pointer to fetch the requested data in step S234, and the fetched data may be sent to a server initiating the query message, e.g. an application server, or to the first server in step S235. In case the requested data is sent to the first server in step S235, the first server may perform step S227.

The decision taken in step S232 can be based on preconfigured parameters maintained within the system. Likewise, the alternative destination for sending fetched data can be based on preconfigured parameters. Alternatively, for one or both decisions to be taken, a respective command can be included e.g. in the query message.

Figure 3:
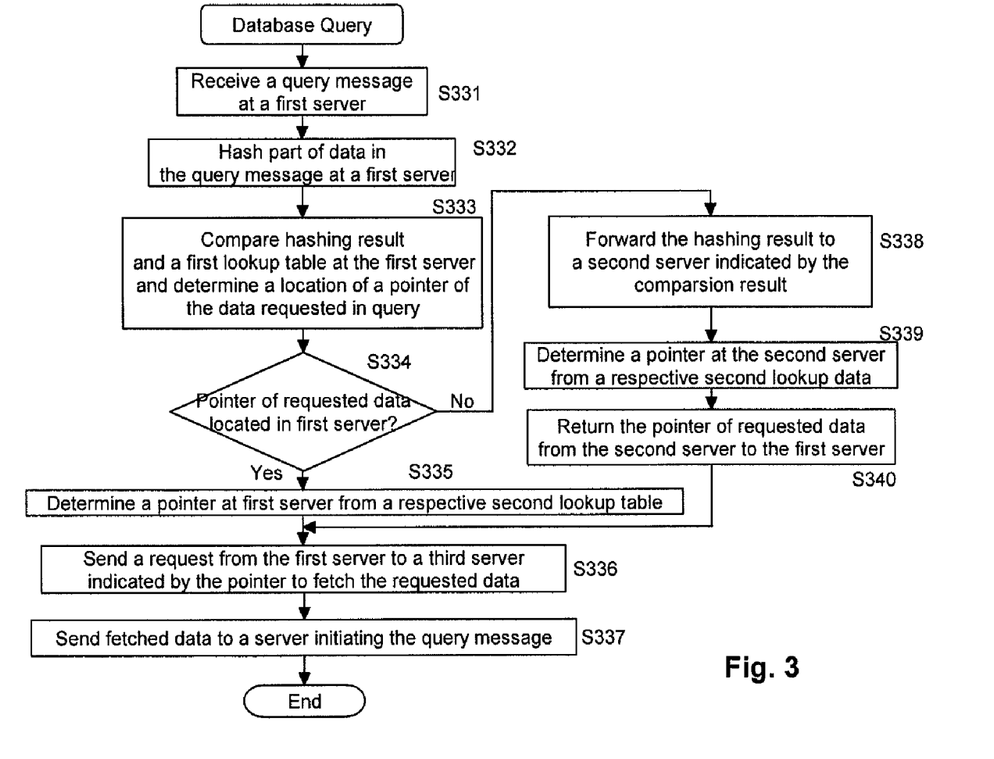
FIG. 3 shows a flow chart illustrating a database query method according to another embodiment of the invention.

FIG. 3 shows a flow chart illustrating a database query method according to another embodiment of the invention.

Steps S331 to S337 performed at a first server correspond to steps S221 to S227 in FIG. 2. Due to the identical steps performed, a repeated description of steps S331 to S333 is therefore omitted here and reference is made to the description of the corresponding steps S221 to S223. The same applies to steps S335 to S337 which correspond to steps S225 to S227.

In step S334 (which corresponds to step S224) it is decided whether the storage location of the respective second lookup table, e.g. the location of the pointer of the requested data, is at the first server or not. If YES in step S334, i.e. the determining in step S333 yields that the storage location of the respective second lookup table is at the first server, and steps S335 to S337 are executed.

However, if NO in step S334, i.e. the determining in step S333 yields that the storage location of the respective second lookup table is at another server, i.e. a second server of the first server type (the second server being different from the first server). Then, in step S338 the transforming result (hashing result) is forwarded from the first server to the second server.

In step S339, an indicator (pointer) indicating a storage location of data requested by the query message is determined at the second server from the respective second lookup table at the second server, and in step S340 the pointer is returned to the first server, and the first server may perform steps S336 and S337.

In other words, in step S338, at the second server, from the first server of the plurality of servers of the first server type, a transforming result based on at least part of data contained in a query message is received.

In step S339, based on the receipt of the transforming result the second server concludes that the storage location of the respective second lookup table is at the second server, accesses the respective second lookup table at the second server and retrieves the indicator indicating the storage location of the data requested by the query message from the respective second lookup table.

In step S340 the retrieved indicator is returned from the second server of the first server type to the first server of the first server type.

As described above in relation to FIGS. 2 and 3, respectively, it is noted that when a second FE-server receives a query message (but not a hashing result), it does hashing due to the format of the second lookup table. But it does, according to an exemplary embodiment, not check the first lookup table anymore. The format of the second lookup table is for example [hash(MSISDN), BE-server ID (IP Address)]. Therefore, forwarding just the hash result is sufficient to enable the lookup in the second lookup table kept at the second front-end server. Namely, in such example scenario, the second server trusts and concludes that it has the key in its second lookup table, since it is responsible according to the routing table (the first lookup table) of the first front-end server. If it cannot find the entry in its second lookup table (which should only happen if the nodes actually storing that entry have failed), this would consequently signify a loss of the entry. The above is based on the assumption that every server knows about all other servers and their IDs. Therefore, only such a (second) front-end server is queried internally from another (first) front-end server if it is seen as responsible for an entry.

According to an embodiment of the invention, a hash-based addressing scheme is used to ensure that load generated by lookup queries (e.g. LDAP requests) is evenly distributed and that every lookup entry stored on a front-end server device (also referred to as node) can be found. It applies to front-end server systems, i.e. systems where the nodes do not contain the final data. Instead, the front-end servers maintain only pointers to the back-end server devices that are responsible for the "real" or actual data.

The total amount of lookup data is not stored fully redundant on every front-end node (which would require large amounts of memory in the front-end nodes), but is partitioned and distributed among all the front-end server devices that make up the entire system, thus decreasing the amount of memory needed on each front-end server device to only a fraction of the entire memory.

Figure 6:
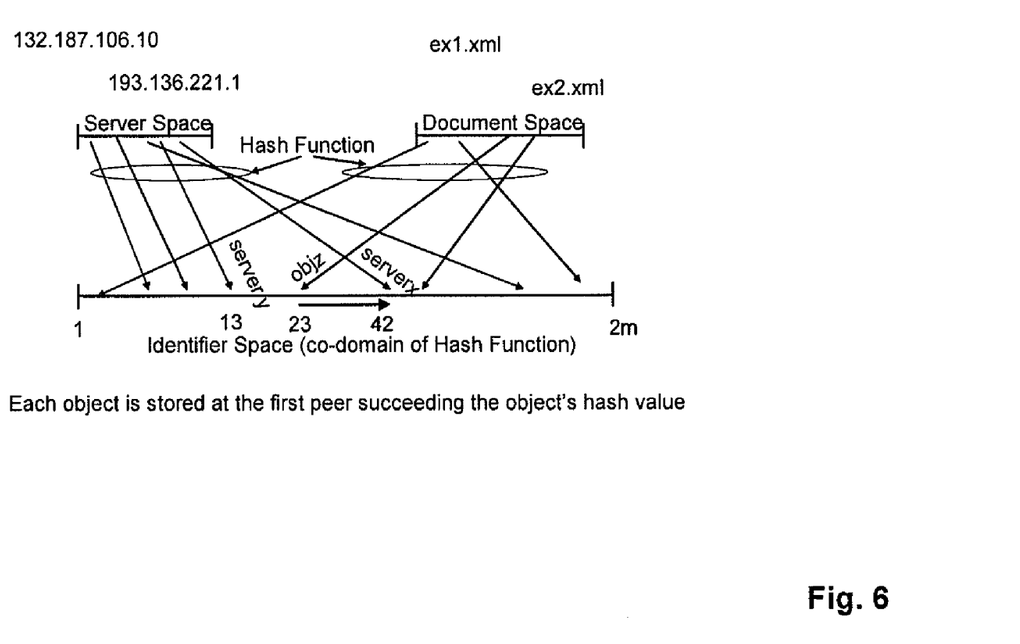
FIG. 6 shows a schematic diagram illustrating server and data placement in an identifier space according to an embodiment of the invention.

According to an embodiment of the invention, data is stored according to the principle of Distributed Hash Tables (DHT), which means that all documents as well as addresses of the front-end devices are hashed to an identifier space. Documents are stored on the front-end device with the lowest ID that is still larger than their own ID (as shown in FIG. 6). As a consequence, each front-end server device is responsible for a continuous range of the identifier space and the documents that fall into this range. The server devices form a logical structure (overlay) that is used to identify the storage location of a specific document.

Shown in FIG. 6 is the basic working mechanism of a hash function, as used for example in the present case in connection with DHTs (Distributed Hash Tables). It maps input values (in this example IP addresses of servers or document names) to its co-domain, which is used as the identifier space in the DHT context. In this figure, the co-domain of the hash function is a linear space, ranging from 1 to 2 m. This is in principle an equally viable value as the [1;2^n-1[ interval used as an example in the present invention. Other variants, such as two coordinates, are also possible.

It is important to note that in this figure, servers are mapped onto the identifier space via the same function in contrast to this invention. However, this is a known and used practice in many DHTs, where a much larger number of servers is used and therefore a quick, collision-free and inexpensive ID generation is needed. Due to the randomness of many hash functions, the positioning of the servers is also random when using this method, which is in part remedied again by the higher number of servers. However, according to this invention, this does not hold, which is why in this invention servers are placed not randomly, but deterministically following the described algorithms. The placement of lookup entries in the present invention is also done based on a hash function applied to the database key that is queried, since the sheer number of entries is sufficient to lead to an equal distribution of entries among the servers.

Figure 5:
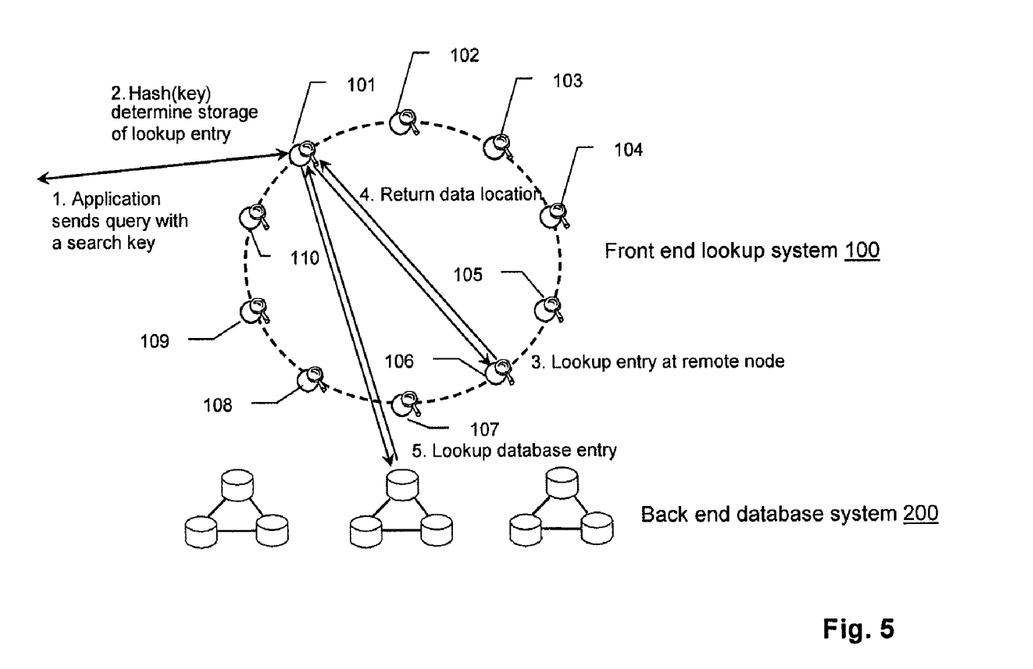
FIG. 5 shows a schematic diagram illustrating query routing according to an embodiment of the invention.

Nevertheless, another principle shown in the figure is the placement of documents (xml files in the example of the figure, lookup entries from the second table in our invention) on the servers. In general, structured overlays such as DHTs gain their comparably good search performance from the fact that documents/data objects have one specific server/node that is responsible for them. This responsibility relationship can normally be easily derived from the hash values (IDs) of the objects and servers. As a consequence, if an object is searched for, just the server that should be responsible for it (if it exists) has to be located and queried. In the example of the figure, the rule for assigning servers to data objects is that an object is stored on the server with the lowest hash value (ID) higher than the hash value of the object. This is the same in the present invention (as also depicted in FIG. 5). For example, the document with hash value 23 (obj z) is stored on the server whose ID succeeds this hash value, in this case server x with hash value/ID 42. This is the main principle that should have been visualized by the figure.

According to the invention, two data structures, i.e. first and second lookup tables, and two processes (two lookup steps) are provided in order to route incoming queries which reach an arbitrary front-end device or server, e.g. by an automatic switch.

The first data structure (e.g. first lookup table 13) is a small routing or "partitioning" table. It contains a table with a first column of IDs of known front-end server nodes of the distributed database system, and a second column that shows which intervals the front-end nodes are responsible for. According to an embodiment of the invention, these intervals are parts of what is usually called "hash space", e.g. all numbers from 0 to $2^n$. The intervals are evenly spaced, so that later on, the load on each of the front-end server devices is the same. If the set of front-end server devices is heterogeneous in capacity, the intervals can also be split according to the individual capacity of the server devices. Depending on the result of the hash function, i.e. a transform of input data obtained from data contained in a database query message, it is immediately derivable from the first data structure (first lookup table) which interval this query belongs to, and accordingly, which front-end server device is responsible for this query. After this, a second process is started, involving a second data structure, i.e. the lookup in a respective second lookup table.

Figure 4:
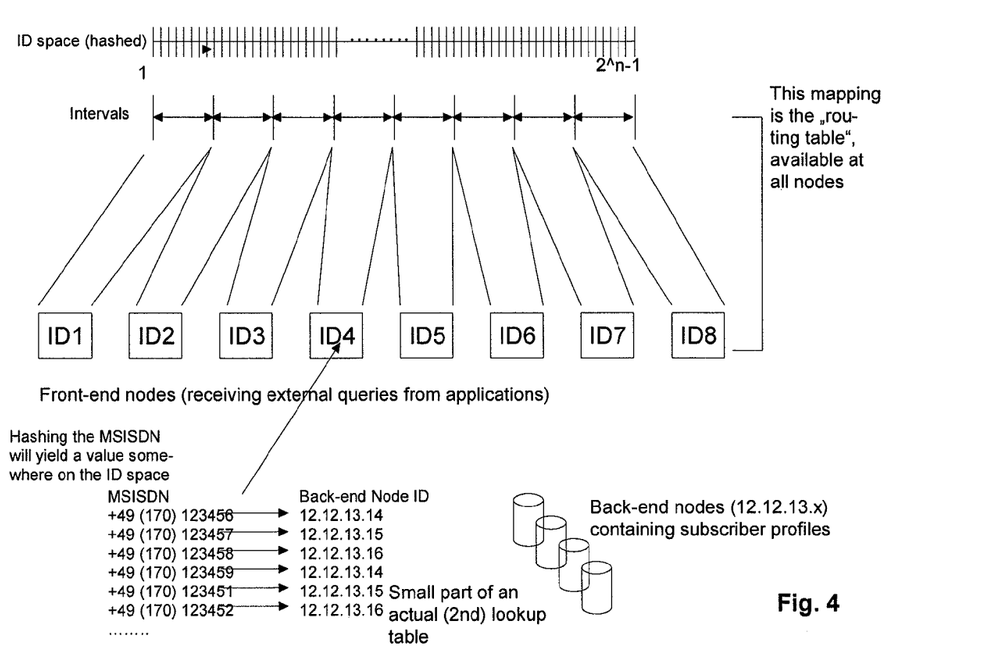
FIG. 4 shows mapping between sections of data stored in back-end server devices and front-end server devices according to an embodiment of the invention.

FIG. 4 shows mapping between sections of data, which is stored in back-end devices, and front-end devices according to an embodiment of the invention. Front-end nodes having IDs ID1 to ID8 are assigned to intervals in a hashed ID space including all numbers from 1 to $2^{n-1}$. Hashing an MSISDN as an example of data contained in a query message received at an arbitrary one of the front-end nodes yields a value in the hashed ID space. For example, a front-end node ID4 receives the query message with MSISDN +49(170)123456, querying a subscriber profile. Hashing this MSISDN yields a value in the ID space which belongs to the interval which front-end node ID1 is responsible for (as indicated in FIG. 4 by the black triangle located within the hashed ID space). Thus, the front-end node ID1 stores the part of an actual lookup table which is necessary for deriving a back-end node which contains the queried subscriber profile for the MSISDN +49(170) 123456.

It is to be noted that FIG. 4 does not show redundancy of responsibilities.

The entire second data structure (i.e. formed of the plurality of respective second lookup tables 14 at the front-end servers) is typically a large lookup table with millions of entries, whereas the routing table (first lookup table) used in the first process only contains as many entries as the number of front-end servers. According to an embodiment of the invention, the second data structure consists of a column containing keys, and one column containing values. As described above, the keys may be an hashed MSISDN, for example, and the values may be Node IDs of (e.g. HLR) back-end servers. When searching locally, a front-end server node will hash the MSISDN and directly find the corresponding, correct back-end server Node ID. This is possible because the described table structure is stored in a standard "hash table" memory data structure, supported by most programming languages. The front-end server will then retrieve the data from the identified back-end server and return it to the front-end server receiving the query (the first front-end server).

FIG. 5 shows a schematic diagram illustrating query routing according to an embodiment of the invention. A front-end server system 100 includes front-end server nodes 101-110. In step 1, front-end node 101 receives a query with a search key. In step 2, the front-end server node 101 hashes the search key and determines storage of a lookup entry, i.e. which front-end server node 101-110 stores the part of the lookup table containing mapping of the search key to a back-end server node or server nodes of a back-end database system 200. In case the front-end server node 101 determines that this lookup entry is stored at remote node 106, it forwards the hashing result to the remote node 106. In step 3, the remote node 106 looks up the back-end server node(s) and returns an indication of the looked up back-end node(s) (location of data requested by query) to the front-end node 101 in step 4. In step 5, the front-end server node 101 looks up an entry in the back-end server node(s) indicated by the remote node 106, i.e. retrieves the data requested by the query.

The first lookup in the first lookup table (partitioning table) is very fast and serves to find out the responsible front-end server device. Only such responsible front-end device can then do the second, local lookup in the respective second lookup table, because only this device holds the necessary table data of the second data structure, which finally leads to the correct back-end device.

Compared with conventional distributed database systems, the system of the present invention is much more reliable, faster and carrier-grade.

The system of the present invention comprises multiple self-organizing, de-centralized and cooperative nodes that may have heterogeneous performance characteristics.

The invention also enables geographically redundant data storage in a fail-safe way which is described below and can achieve response times and/or answer times for returning an answer/response to a request that stay within certain, predetermined bounds.

As described above, the system of the present invention requires less memory (e.g. RAM) at the expense of slightly increased CPU processor load and network traffic.

Figure 8:
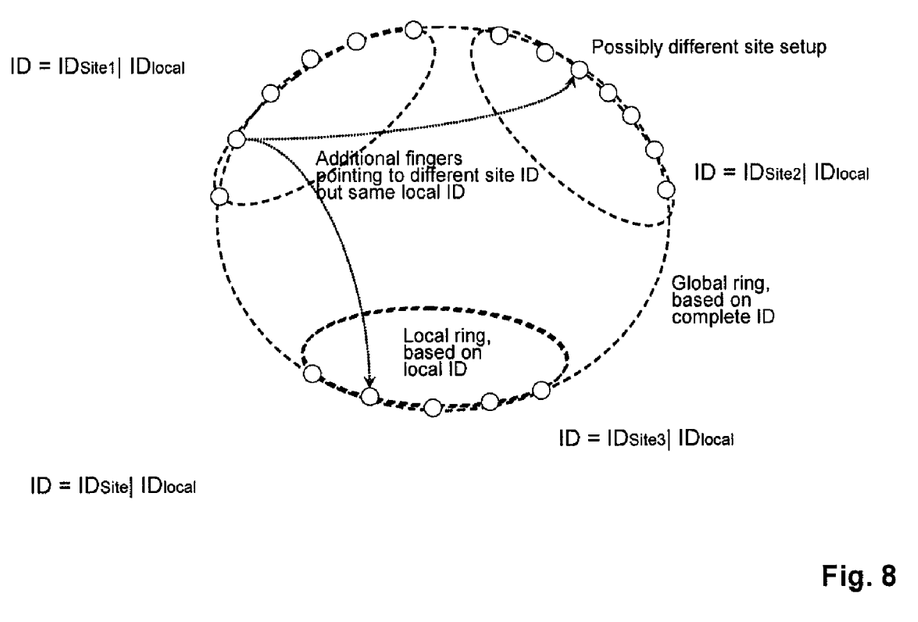
FIG. 8 shows a schematic diagram illustrating a geographically redundant storage scheme according to an embodiment of the invention.

In the following, an embodiment of the invention is described which is directed to a single "site" or domain of the lookup system, where the total amount of lookup data is stored in full, distributed among the front-end servers constituting the domain. Later on another embodiment of the invention is described which is directed to a system consisting of several, physically remote sites or domains as shown in FIG. 8.

In the so-called single site lookup system according to an embodiment of the invention, all front-end server devices constituting the front end system are logically connected and integrated in an overlay. This overlay has a ring structure as shown in FIG. 5, which forms an ID space used for addressing and routing in this overlay. The devices are physically connected in a Local Area Network (LAN), in order to ensure short transmission times for messages between the server devices (also referred to as nodes).

Each data item is placed in the overlay by hashing the search key of the original database query (e.g., the MSISDN in a subscriber database). This hash value is at the same time the key for the <key, value> pair of the corresponding lookup entry. In addition, each device has its own overlay address, which corresponds to its position in the ID space. The addresses of all devices determine how much of the total lookup data each device has to store, i.e. in case a number of x different addresses of front end servers are assigned, each of these store 1/x as a percentage of the entire second lookup table, i.e. a respective second lookup table at each frontend server device has a size of 1/x of the entire data amount. If 2x server addresses are assigned, the entire second lookup table can be distributed and/or shared among double amount of frontend servers, so that each of these needs to store only half the data amount compared to the previous example. Each device 101-110 is primarily responsible for the lookup entries that are placed between the overlay ID of the predecessor of the device (i.e., the device with the highest ID lower than the ID of the device), and the overlay ID of the device itself (see FIGS. 6 & 7). For example, the device 106 is responsible for the lookup entries that are placed (in the hash space) between device 105 and device 106. FIG. 6 shows device and data placement in the ID (identifier) space. Each object is stored at a first peer succeeding the objects hash value.

There are different options regarding generation and assignment of Node IDs. One method is to "hash" an IP address of a device. The result will be a bit-string, e.g. 128 or 256 bit. Even if two IP (Internet Protocol) addresses are very similar (e.g. 10.10.10.1 and 10.10.10.2), the hash output is totally different and distributed over a large distance in the hash space which comprises all possible numbers.

With the present invention, each front-end node only needs to store a portion of the overall second lookup table that is constituted upon combining all respective second lookup tables at the front-end servers. When a query arrives at one of the front-end server devices, for example the MSISDN is extracted from an LDAP request and then it is hashed. Based on the outcome of the hashing function, the front-end device is able to determine (based on the first lookup table) whether data requested by the query is within its own valid range that this front-end device is responsible for. If the front-end device is not responsible for the requested data, it can determine where to forward the query to the device responsible for the requested data, because all front-end devices have a complete "routing" table (i.e. first lookup table 13) available locally.

Such second front-end server device then becomes active itself and resolves the query by itself. Again, it may hash the MSISDN, but this time it only does a local data structure lookup in the second of the two data structures, and this time it retrieves the ID of the responsible back-end device that finally has the valid, complete subscriber profile associated to the MSISDN. Actually, the second front-end device does not have to hash the MSISDN again, because the hashed value can be forwarded directly by the first front-end server device to the second front-end server. Only in case the first front-end server device forwards the original query to the second front-end device, the second front-end device has to hash the MSISDN again. The query resolving at the second device can only fail if data loss has occurred or the queried data is not stored in the system 200. Thus, no additional lookup in the first lookup table of the second front-end server is needed.

For the further proceeding of the query, there are two options.

According to a first option, the second front-end device queries the identified back-end device itself, retrieving the profile or other data associated with the query key, and returns the full result to the first front-end device which may then in turn forward the profile and other data back to an application that may have sent the query.

According to a second option, the second front-end device only returns a pointer to the identified back-end device to the first frond-end device, which then queries the back-end device and returns the results to the application.

It is important to note, however, that the complete resolving of the query is a multi-step process as shown e.g. in FIGS. 2, 3 and 5.

At first, a front-end device is identified which has information about which back-end device holds a data set the query is requesting.

Then, the query is forwarded to the identified front-end device. This second front-end device locally looks up which back-end device will have the data set available the query is requesting. The second front-end device then either resolves the query with the back-end device directly, or, alternatively, just sends the ID of the back-end device to the first front-end device which will then do the final querying.

In any case, the final result from the back-end device is returned to the application sending the query to the first front-end device.

According to another embodiment, the back-end device sends the data set that corresponds to the received query to the first front-end device instead of the second front-end device, so that the second front-end device becomes state-less. For this purpose, an IP address of the first front-end device has to be added to the query during the routing phase to the back-end device.

According to a further embodiment, the back-end device sends the data set that corresponds to the received query directly to the application that issued the query, so that the first and second front-end devices become state-less. For this purpose, in such an example scenario, an IP address of the application has to be added to the query during the routing phase to the back-end device.

According to a still further embodiment, the front-end server nodes can also be located on the same platform and the same nodes as the application servers, thereby saving the dedicated set of front-end devices.

Figure 7:
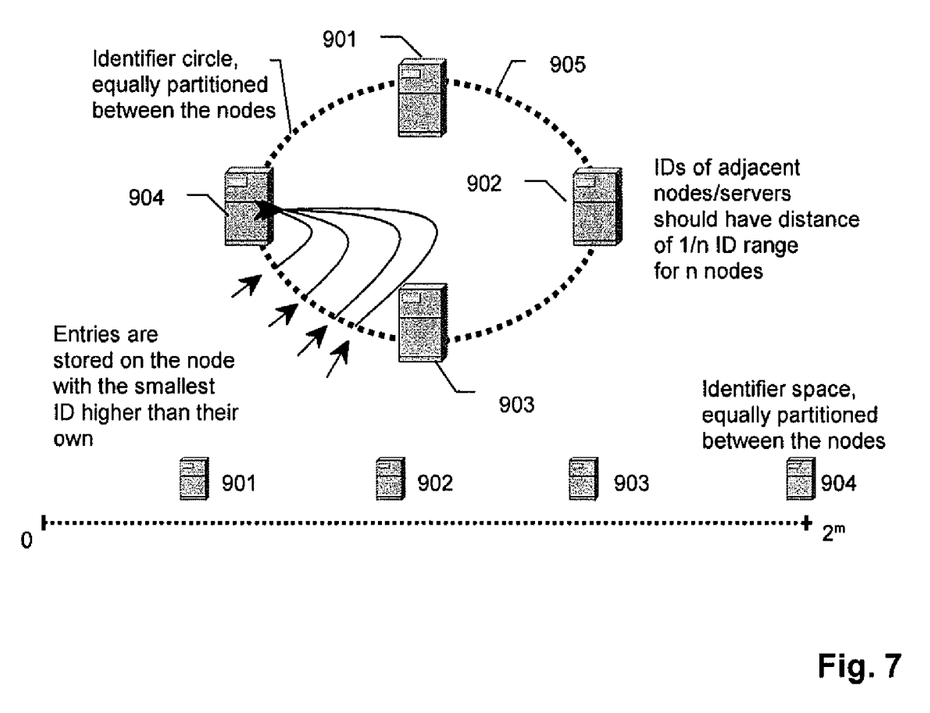
FIG. 7 shows a schematic diagram illustrating "positioning" of front-end server devices in (or assignment of front-end server devices to) an identifier space according to an embodiment of the invention.

In order to introduce load balancing into the system, each device should store approximately the same amount of lookup data, or the amount of lookup data is balanced in accordance with device conditions. This ensures that memory consumption on each node is equal, allowing for less memory to be installed on all nodes, and that the same amount of queries has to be resolved by each node. To achieve this, the front-end devices are placed equidistant on the identifier ring (mapped to the ID space (hashed)). Such overlay is shown e.g. in FIGS. 4 and 7. Front-end server devices 901-904 are placed on an identifier circle 905 which is equally partitioned between the devices 901-904. Lookup table (i.e. second lookup table 14) entries are stored on the device with the smallest ID higher than their own IDs. IDs of adjacent devices should have a distance of 1/n ID range for n devices. With the equally partitioned identifier circle 905, the identifier space is equally partitioned between the devices 901-904 as shown in FIG. 7.

However, since the system should be transparent to an external application querying the database, each front-end device must be able to receive queries for any of the data sets in the back-end system, and accordingly has to be able to resolve these queries. Since one front-end server device does not hold the complete second lookup data but only a respective part thereof, an internal routing mechanism is introduced in order to reach the remote device where the lookup entry for a given query is located. According to the addressing scheme described above, each front-end server device stores a small routing table, i.e. the first lookup table, comprising all front-end devices in the system, with their overlay IDs as addresses. For a given database query, a front-end device can decide which other front-end device is responsible for the corresponding lookup entry by hashing the database search key and retrieving the front-end device with the lowest ID higher than the hashed key.

According to an embodiment of the invention, at most one forwarding of the query message or the transform result from a first front-end server that initially receives the query message to another front-end server (second front-end server) is needed.

A front-end device according to the present invention may have several software modules allowing it to offer the functionality described above.

According to an embodiment, the front-end device comprises a hash module which has to accept all key types as input that may be used as keys for the database query. It uses a hash function to map these keys to the identifier space, e.g., [0; $2^{160}$[. One example for such a function is the SHA-1 algorithm. The hash module returns the hash value of a key used as input.

Moreover, the front-end device may comprise a routing module which stores all nodes known to participate in the front-end system in a small routing table. It returns the front-end device responsible for the lookup entry of a given key.

The front-end device may further comprise a lookup module which holds the lookup entries stored on the local front-end device in a data structure. It allows read, write, create and delete functions on these entries as well as the retrieval of entire blocks of entries, i.e., whole ranges of the ID space.

According to a further embodiment of the invention, the concept of the invention is applied recursively, in order to improve reliability, scalability and resilience of the overall system, that can be spread across multiple physical locations (a "location" representing a site or domain as mentioned before) as shown in FIG. 8. In case the complete content of the entry lookup table should be stored not only in one physical location, but is copied to several sites to increase redundancy and failure protection, the logical system described above can be extended in order to include all front-end devices at all sites. In order to achieve this, the IDs described above are treated as local IDs "$ID_{local}$". To these, a prefix "$ID_{Site}$" is added which denotes the site, resulting in a global $ID=ID_{Site}|ID_{local}$. As long as no inter-site traffic is necessary, the local IDs are sufficient for the intra-site routing process as described above. If a connection between two remote front-end server devices has to be established, the global ID is used to identify them. This means that the routing table (first lookup table) has to be enlarged to hold not only the front-end devices at the local site, but all front-end devices at every site. FIG. 8 shows the logical structure of such overlay network.

If a special data set is to be retrieved from a remote site, it can be found by constructing a global ID from the site ID of the remote site and the local ID for that data set.

The present invention is applicable to Home Location Register, Subscriber Repository, carrier network technology data base and CPS (Common Profile Storage) systems.

For the purpose of the present invention as described above, it should be noted that method steps likely to be implemented as software code portions and being run using a processor at one of the server entities are software code independent and can be specified using any known or future developed programming language;

method steps and/or devices likely to be implemented as hardware components at one of the server entities are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices can be implemented as individual devices, but this does not exclude that they are implemented in a distributed fashion throughout the system, as long as the functionality of the device is preserved.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method, comprising:
receiving a query message at a first server of a plurality of servers of a first server type;
transforming at least part of data contained in the query message to a transforming result;
determining, based on the transforming result and a first lookup table at said first server, a storage location of a respective second lookup table at one of said plurality of servers of said first type,
accessing the respective second lookup table at the determined storage location of the respective second lookup table at one of said plurality of servers of said first type,
retrieving an indicator indicating a storage location of data requested by the query message from the respective second lookup table,
wherein said first server comprises said first lookup table and said respective second lookup table.

2. The method according to claim 1, comprising
performing the accessing at the first server, if said determining yields that the storage location of the respective second lookup table is at said first server.

3. The method according to claim 1, comprising
forwarding the transforming result or the query message from the first server to a second server of the first server type different from the first server, if said determining yields that the storage location of the respective second lookup table is at the second server.

4. The method according to claim 3, comprising
receiving at the first server of the first server type, the retrieved indicator from the second server of the first server type, after access to the second lookup table at the second server based on the forwarded transforming result or the query message.

5. The method according to claim 3, comprising
receiving at the first server, the data requested by the query message, from the second server of the first server type after access to a server of a plurality of servers of a second server type based on the indicator retrieved on the basis of the query message.

6. The method according to claim 1, wherein the respective second lookup table at a server of the first server type comprises at least one pair of data, including, for each transforming result, a pointer indicating a location of data stored in a server of a second server type, wherein the respective second lookup tables of all servers of the first server type constitute a complete lookup table.

7. The method according to claim 6, wherein respective second lookup tables of each server of the first server type equal each other in terms of size, or differ from each other in terms of size in proportion to a respective processing capacity of each of said servers, or in such a manner that a processing load for each of the servers of the first server type equals each other.

8. The method according to claim 1, wherein the first lookup table comprises at least a pair of data, wherein each pair of data comprises
an address of a server of the first server type and a value range defined by a starting value and an end value, in a space to which the part of data in the query message is transformed.

9. The method according to claim 8, wherein
servers of the first server type are front-end servers and said address is an IP address of the respective servers.

10. The method according to claim 1, wherein said transforming comprises mapping a string into a natural integer.

11. The method according to claim 8, wherein said space is a Hash space resulting from transforming by a Hash transform.

12. A method, comprising
receiving, at a second server of a first server type from a first server of a plurality of servers of the first server type, a query message or a transforming result based on at least part of data contained in the query message;
concluding, based on the receipt of the query message or the transforming result, that a storage location of a respective second lookup table is at the second server,
accessing the second lookup table at the second server of said first type, and
retrieving an indicator indicating a storage location of data requested by the query message from the second lookup table,
wherein said first server comprises said first lookup table, indicating a storage location of a respective second lookup table at one of said plurality of servers of said first type, and said second lookup table.

13. The method according to claim 12, further comprising transforming at least part of data contained in the query message to a transforming result, in case the query message is received.

14. The method according to claim 12, comprising
returning the retrieved indicator from the second server of the first server type to the first server of the first server type.

15. The method according to claim 12, wherein the respective second lookup table at a server of the first server type comprises at least one pair of data, including, for each transforming result, a pointer indicating a location of data stored in a server of a second server type, wherein the respective second lookup tables of all servers of the first server type constitute a complete lookup table.

16. The method according to claim 15, wherein respective second lookup tables of each server of the first server type equal each other in terms of size, or differ from each other in terms of size in proportion to a respective processing capacity of each of said servers, or in such a manner that a processing load for each of the servers of the first server type equals each other.

17. A server, comprising:
a first lookup table, indicating a storage location of a respective second lookup table at one of a plurality of servers of a first server type, and a second lookup table;
a transformer configured to transform at least part of data contained in a query message to a transforming result;
a processor configured to
determine, based on the transforming result and a first lookup table, a storage location of a respective second lookup table at one of a plurality of servers of a first server type,
access the second lookup table at the server if the processor determined that the storage location of the respective second lookup table is at the server, and to
retrieve an indicator indicating a storage location of data requested by the query message from the second lookup table,
the server being said first server type.

18. The server according to claim 17, comprising
an interfacing unit configured to forward the transforming result or the query message to another server of the plurality of servers, if said processor determined that the storage location of the respective second lookup table is not at the server.

19. The server according to claim 18, wherein
the interfacing unit is configured to receive the retrieved indicator from the another server.

20. The server according to claim 18, wherein
the interfacing unit is configured to receive the data requested by the query message from the another server.

21. The server according to claim 17, comprising
an interfacing unit configured to send the retrieved indicator or the data requested by the query message to another server.

22. The server according to claim 17, wherein the server is of a first server type, and wherein the respective second lookup table comprises at least one pair of data, including, for each transform result, a pointer indicating a location of data stored in a server of a second server type, wherein the respective second lookup tables of all servers of the first server type constitute a complete lookup table.

23. The server according to claim 22, wherein the respective second lookup tables of each server of the first server type equal each other in terms of size, or differ from each other in terms of size in proportion to a respective processing capacity of each of said servers or in such a manner that a processing load for each of the servers of the first server type equals each other.

24. The server according to claim 17, wherein the first lookup table comprises at least a pair of data, wherein the pair of data comprises an address of servers of a first server type and a value range defined by a starting value and an end value, in a space to which the part of data in the query message is transformed.

25. The server according to claim 24, wherein
servers of the first server type are front-end servers and said address is an IP address of the respective servers.

26. The server according to claim 17, wherein said transformer is configured to map a string into a natural integer.

27. The server according to claim 24, wherein said transformer is configured to apply a Hash transform, and said space is a Hash space resulting from said Hash transform.

28. A server, comprising:
a first lookup table, indicating a storage location of a respective second lookup table at one of a plurality of servers of a first server type, and a second lookup table;
an interfacing unit configured to receive, from another server of a plurality of servers of said first server type, a query message or a transforming result based on at least part of data contained in the query message;
a processor configured to
conclude, based on the receipt of the query message or the transforming result that a storage location of a respective second lookup table is at the server,
access the second lookup table at the server, and
retrieve an indicator indicating a storage location of data requested by the query message from the second lookup table,
the server being said first server type.

29. The server according to claim 28, further comprising
a transformer configured to transform at least part of data contained in the query message to a transforming result, in case the query message is received.

30. The server according to claim 28, wherein
the interfacing unit is configured to return the retrieved indicator or the data queried by the query message, from the server to another server from which the query message or transform result was received.

31. The server according to claim 28, wherein the server is of a first server type, and wherein the respective second lookup table comprises at least one pair of data, including, for each transform result, a pointer indicating a location of data stored in a server of a second server type, wherein the respective second lookup tables of all servers of the first server type constitute a complete lookup table.

32. The server according to claim 31, wherein the respective second lookup tables of each server of the first server type equal each other in terms of size, or differ from each other in terms of size in proportion to a respective processing capacity of each of said servers or in such a manner that a processing load for each of the servers of the first server type equals each other.

33. A system comprising:
a first server comprising:
transformer configured to transform at least part of data contained in a query message to a transforming result;
a processor configured to
determine, based on the transforming result and a first lookup table, a storage location of a respective second lookup table at one of a plurality of servers of a first server type, wherein the first server comprises said first lookup table and said respective second lookup table, access the second lookup table at the server if the processor determined that the storage location of the respective second lookup table is at the server, and to retrieve an indicator indicating a storage location of data requested by the query message from the second lookup table; and a second server comprising:

an interfacing unit configured to receive, from another server of a plurality of servers of a first server type, a query message or a transforming result based on at least part of data contained in the query message;

a processor configured to conclude, based on the receipt of the query message or the transforming result that a storage location of a respective second lookup table is at the server, access the second lookup table at the server, and to retrieve an indicator indicating a storage location of data requested by the query message from the second lookup table.

34. A computer program product, embodied on a computer-readable medium, comprising processor implementable computer code for performing:

receiving a query message at a first server of a plurality of servers of a first server type;

transforming at least part of data contained in the query message to a transforming result;

determining, based on the transforming result and a first lookup table at said first server, a storage location of a respective second lookup table at one of said plurality of servers of said first type, wherein the first server comprises said first lookup table and said respective second lookup table, accessing the respective second lookup table at the determined storage location of the respective second lookup table at one of said plurality of servers of said first type, retrieving an indicator indicating a storage location of data requested by the query message from the respective second lookup table.

35. A computer program product, embodied on a computer-readable medium, comprising processor implementable computer code for performing:

receiving, at a second server of a first server type from a first server of a plurality of servers of the first server type, a query message or a transforming result based on at least part of data contained in the query message;

concluding, based on the receipt of the query message or the transforming result, that a storage location of a respective second lookup table is at the second server, accessing the second lookup table at the second server of said first type, retrieving an indicator indicating a storage location of data requested by the query message from the second lookup table, wherein said first server comprises said first lookup table, indicating a storage location of a respective second lookup table at one of said plurality of servers of said first type, and said second lookup table.

* * * * *